(12) United States Patent
Ezzahid

(10) Patent No.: US 10,175,926 B1
(45) Date of Patent: Jan. 8, 2019

(54) MULTIFUNCTION PROXIMITY DIGITAL BILLBOARD

(71) Applicant: Mehuva, Inc., San Francisco, CA (US)

(72) Inventor: Hicham Ezzahid, Dubai (AE)

(73) Assignee: MEHUVA, INC., San Francisco, CA (US)

( * ) Notice: Subject to any disclaimer, the term of this patent is extended or adjusted under 35 U.S.C. 154(b) by 0 days.

(21) Appl. No.: 15/583,669

(22) Filed: May 1, 2017

Related U.S. Application Data

(60) Provisional application No. 62/330,392, filed on May 2, 2016.

(51) Int. Cl.
| | | |
|---|---|---|
| *G06F 3/14* | (2006.01) | |
| *G06Q 30/02* | (2012.01) | |
| *G06F 3/041* | (2006.01) | |
| *H04W 4/80* | (2018.01) | |

(52) U.S. Cl.
CPC ............ *G06F 3/1446* (2013.01); *G06F 3/041* (2013.01); *G06F 3/1454* (2013.01); *G06Q 30/0241* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 5,494,445 | A * | 2/1996 | Sekiguchi | A63F 3/0421 40/436 |
| 5,695,346 | A * | 12/1997 | Sekiguchi | G02B 27/2214 40/436 |
| D725,911 | S | 4/2015 | McManus et al. | |
| 2002/0195467 | A1* | 12/2002 | Meder | B01D 3/02 222/146.6 |
| 2004/0129723 | A1* | 7/2004 | Meder | B01D 3/02 222/113 |
| 2014/0104139 | A1* | 4/2014 | Buchner | G06F 3/1438 345/1.3 |
| 2014/0302773 | A1* | 10/2014 | Jantunen | H04W 8/005 455/3.01 |
| 2015/0194083 | A1* | 7/2015 | Sinha | G09G 3/007 345/212 |
| 2016/0224306 | A1* | 8/2016 | Rycyna, III | G09G 3/32 |
| 2016/0307476 | A1* | 10/2016 | Cox | G09G 3/32 |
| 2017/0003851 | A1* | 1/2017 | Moore | G06F 3/04815 |

* cited by examiner

*Primary Examiner* — Duane N Taylor, Jr.
(74) *Attorney, Agent, or Firm* — DLA Piper LLP (US)

(57) ABSTRACT

A multifunction proximity digital billboard, including a set of display panels each positioned and formed to provide an information display; a resource bay that includes a set of resources for driving a content of the display panels and for communication to and from the digital billboard; a removable module for providing a function that is adapted to a particular deployment of the digital billboard, a set of sensors to gather environmental data and a charging module for charging external mobile devices.

15 Claims, 16 Drawing Sheets

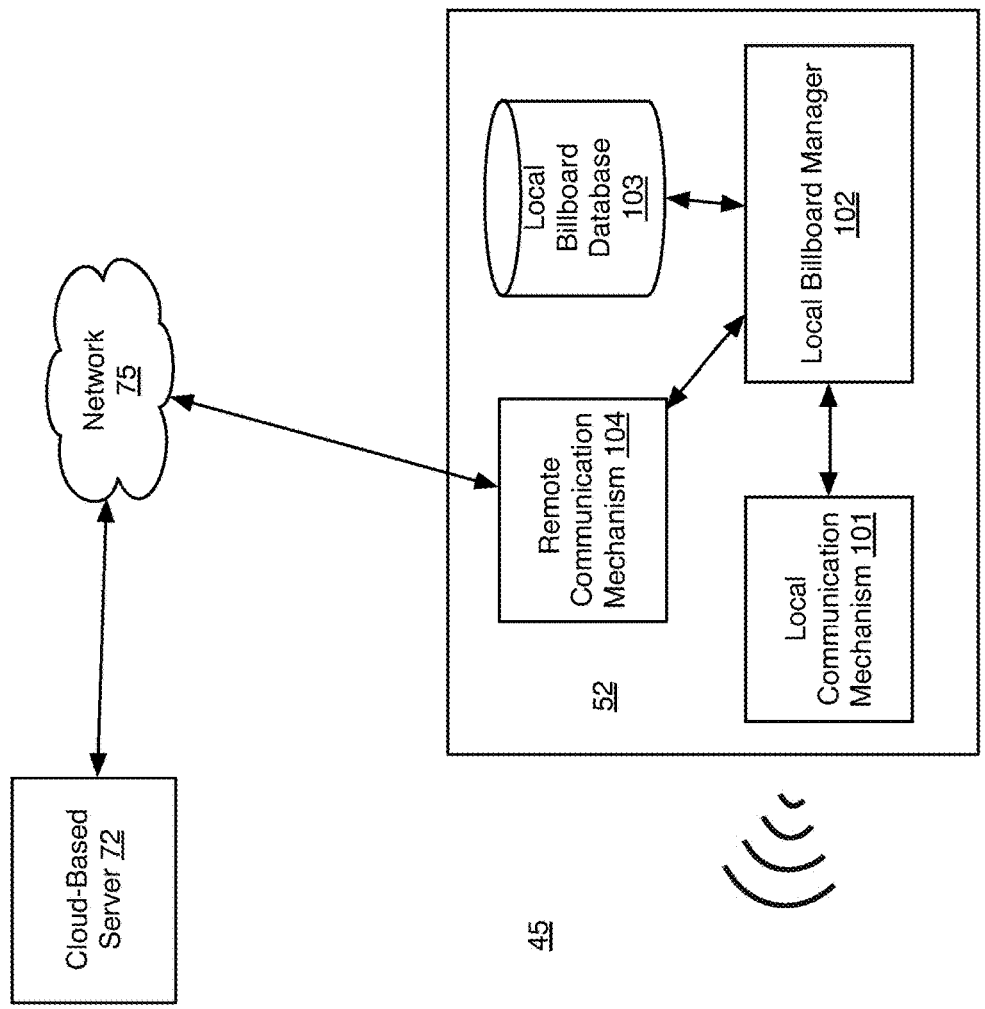
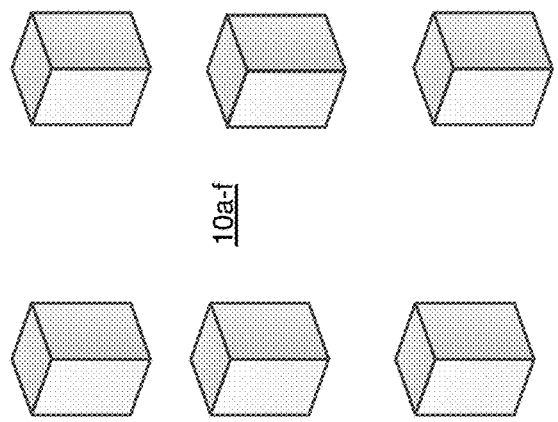
Fig. 10

MULTIFUNCTION PROXIMITY DIGITAL BILLBOARD

PRIORITY CLAIMS/RELATED APPLICATIONS

This application claims the benefit under 35 USC 119(e) and priority under 35 USC 120 to U.S. Provisional Patent Application Ser. No. 62/330,392, filed May 2, 2016 and entitled "Multifunction Proximity Digital Billboard", the entirety of which is incorporated herein by reference.

FIELD

The disclosure relates generally to a digital billboard and in particular to a multifunction proximity digital billboard.

BACKGROUND

Messages, e.g., advertisements, can be provided to potential viewers using billboards, signs, etc., posted in public places, businesses, etc. Billboards and signs can be electronic so that messages can change over time.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 10 illustrates a local server for a set of digital billboards in one or more embodiments.

DETAILED DESCRIPTION OF ONE OR MORE EMBODIMENTS

Figure 1:
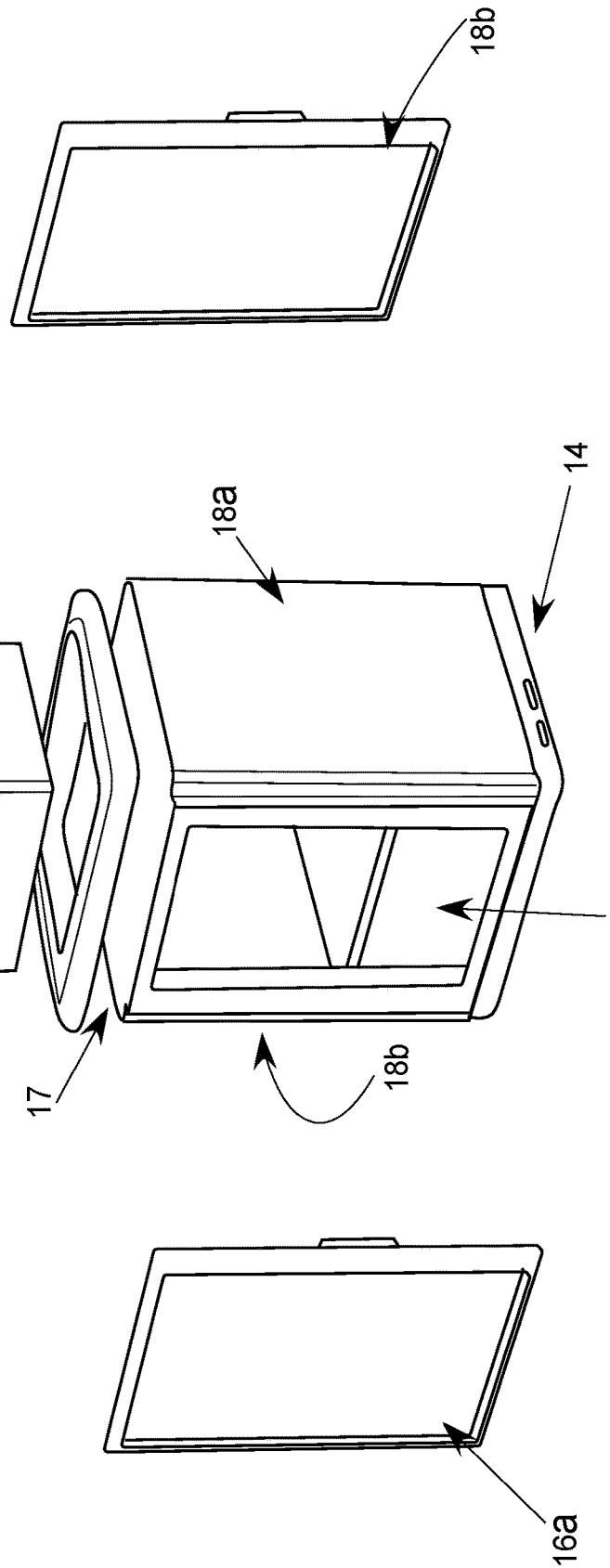
FIG. 1 illustrates a digital billboard in one or more embodiments.

In general, in one aspect, the disclosure relates to a digital billboard. The digital billboard can include: a set of display panels each positioned and formed to provide an information display; a resource bay that includes a set of resources for driving a content of the display panels and for communication to and from the digital billboard; and a removable module for providing a function that is adapted to a particular deployment of the digital billboard.

In general, in another aspect, the disclosure relates to a method for digital billboard messaging. The method can include: distributing a set of digital billboards in a set of gathering venues, each digital billboard having a form factor that enables placement in among a set of potential viewers present in the corresponding gathering venue; sending a local billboard message adapted to an activity associated with the corresponding gathering venue to each digital billboard such that each of the digital billboard displays the corresponding local billboard message; and sending a remote billboard message adapted to an activity outside of the corresponding gathering venue to each digital billboard such that each digital billboard displays the corresponding remote billboard message.

Other aspects of the disclosure will be apparent from the following description and the appended claims.

Reference will now be made in detail to the various embodiments of the present disclosure, examples of which are illustrated in the accompanying drawings. Like elements in the various figures are denoted by like reference numerals for consistency. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, have not been described in detail so as not to unnecessarily obscure aspects of the present disclosure.

FIG. 1 is an exploded view of a digital billboard 10 in one or more embodiments. The digital billboard 10 may have a housing that has one or more walls portions and the housing may have different shapes as described below. The digital billboard 10 includes a set of display panels 16*a-b* that provide an information display and are attached to the one or more wall portions of the housing. The digital billboard 10 includes a resource bay 13 that contains a set of hardware and software resources for driving a content of the display panels 16*a-b* and for communication to and from the digital billboard 10. The digital billboard 10 includes a removable module 12 that can be customized to active and passive functions of the digital billboard 10. The housing may have a hollow central region as shown in FIG. 1 in which the resource bay 13 is located and into which the removable module 12 may fit.

The display panels 16*a-b* can be high definition display panels. In one or more embodiments, the display panels 16*a-b* are a pair of LCD high definition touchscreen panels positioned on respective opposite sides the digital billboard 10. The display panels 16*a-b* can be run in a mirroring mode or in extended display mode.

The resource bay 13 can hold a processor module with a low power consumption CPU that executes an open source operating system. The processor module can include flash storage, e.g., 64 Gb, for the operating system and the software for driving the display panels 16*a-b* and for holding the content to be displayed on the display panels 16*a-b*.

The resource bay 13 can include a communication mechanism that enables communication between the digital billboard 10 and devices on a network. Examples of such a communication mechanism include a Wi-Fi communication module, a Bluetooth communication module, a broadband communication module, etc.

The resource bay 13 can include a communication mechanism that enables communication over a substantially short range between the digital billboard 10 and a mobile device. An example of such a communication mechanism is a near field communication (NFC) chip. An NFC chip can enable "active digital distribution" to embed an action along with the content that is being displayed on the digital billboard 10. For example, the digital billboard 10 can display the image of a music concert that has an associated action that can be triggered via the NFC chip when a mobile device is placed close to the digital billboard 10. The triggered action on the mobile device can be to buy a ticket to the music concert. In other example, placement of a mobile device close to the digital billboard 10 can trigger an app download to the mobile device. The resource bay 13 can include a Bluetooth chip that enables interactions external devices.

The resource bay 13 can include a set of batteries that power the digital billboard 10 and that enable the digital billboard 10 to charge a mobile device. In one or more embodiments, the resource bay 13 holds two high capacity rechargeable batteries.

The digital billboard 10 in one or more embodiments includes a charging mechanism 14. The charging mechanism 14 can be a wireless charging surface for inductive charging of external mobile devices and phones. For example, the wireless charging technology may be a Qi wireless charging surface, a PMA wireless charging system, a 4AWP wireless charging system or any other existing wireless charging technologies or any yet to be developed wireless charging technologies. Multiple external mobile devices can be charged based on the power stored in the batteries inside the resource bay 13. Two batteries are preferred in order to isolate the battery that powers up the digital billboard 10 from the battery that provides charging to external devices. In the embodiment shown in FIG. 1, the charging mechanism may be located on a top portion of the digital billboard 10. In other embodiments, the digital billboard 10 may have one or more charging mechanisms 14 located on side portions of the housing of the digital billboard 10.

The digital billboard 10 in one or more embodiments includes a set of sensors 17 for sampling environmental data. Examples of the sensors 17 include sensors that can measure ambient temperature, ambient light levels, humidity, air quality, etc. The digital billboard 10 can automatically switch off if the temperature is not within an operating range. Based on the ambient light intensity, the brightness of the display panels 16*a-b* can be automatically adjusted to an optimal level. Information on the ambiance of the venues, especially at night, can be gathered, e.g., dimmed light ambiance or a bright ambiance.

The environmental data obtained from the sensors 17 can be sent to a local or cloud-based server, and aggregated air quality data from the various venues having digital billboards can be used to generate statistics about air quality by neighborhood, city, etc. For example, the measurements and statistical calculations can be done by a central software platform.

In one or more embodiments, the digital billboard 10 displays messages on the display panels 16*a-b* in response to the environmental data obtained by the sensors 17. For example, the digital billboard 10 can upload the environmental data obtained by the sensors 17 to a server and the server can in turn generate/select a message based on the uploaded environmental data. For example, different messages can be selected for display on the display panels 16*a-b* based on current temperature range, humidity, light levels, etc.

The sensors 17 can be used to gather information about the environment where the digital billboard 10 is placed, e.g., air quality, temperature range and humidity. Environmental data can be mapped to the venues. The mapping can be used, for example, to determine the overall comfort level that customers are likely to experience in each venue. The mapping can be used, for example, to run a targeted ad campaign based on environmental data. For example, run a given ad campaign only in cold venues or only in hot venues.

In one or more embodiments, the digital billboard 10 includes a respective set of LED lamps 18*a-b* positioned on opposite panels of the digital billboard 10 from the display panels 16*a-b*. The LED lamps 18*a-b* can provide ambient decorative effects. The respective opposing LED lamps 18*a-b* can provide a visual effect and an ambient lighting around the digital billboard 10. For example, in an outdoor venue at night, the LED lamps 18*a-b* can provide an "art deco" effect. The LED colors and intensity can be adjustable via a small slider button on the digital billboard 10.

Figure 2:
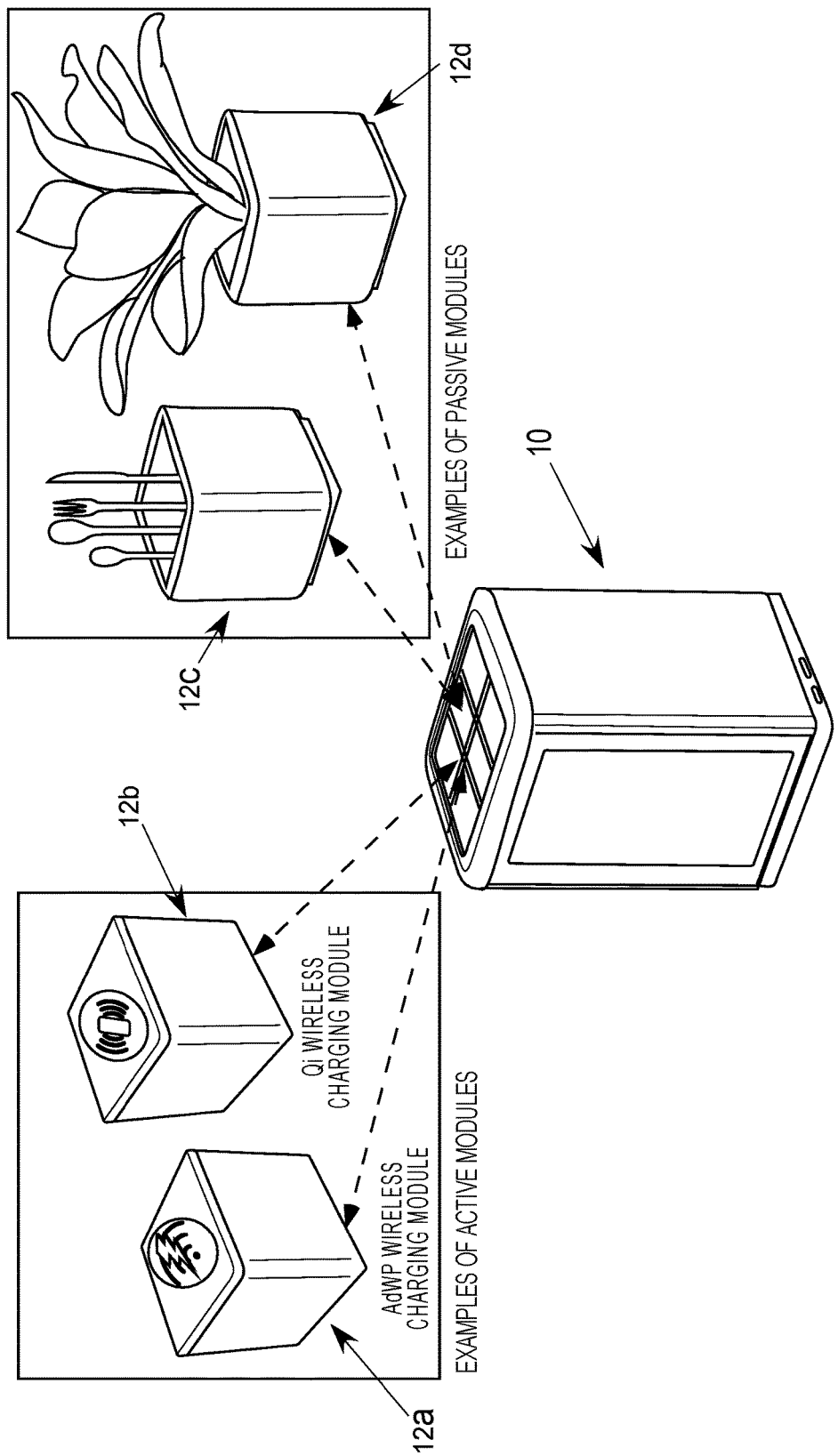
FIG. 2 shows examples of removable modules for a digital billboard including active modules and passive modules.

FIG. 2 shows examples of the removable module 12 including a pair of active modules 12*a-b* and a set of passive modules 12*c-d*. The active modules 12*a-b* are examples of charging modules that enable charging of mobile devices placed on the top of the digital billboard 10. The passive module 12*c* is an example of a utensil holder function of the digital billboard 10 and the passive module 12*d* is an example of a decorative function of the digital billboard 10.

The removable module 12 in one or more embodiments can be embodied in an ambient art deco lamp having two control buttons—one to change the color spectrum and another one to change the light intensity, e.g. for an art-deco effect to create an ambient lighting.

In some embodiments, the charging of mobile devices can be done via a set of USB ports of the digital billboards 10. For example, customers in a venue can plug their mobile device in one of the USB ports to charge their device and different types of charging cables can be provided to fit the various connectors. A special charging device, e.g., an inductive charging device, can be used to charge the internal batteries of the digital billboard 10.

Figure 3:
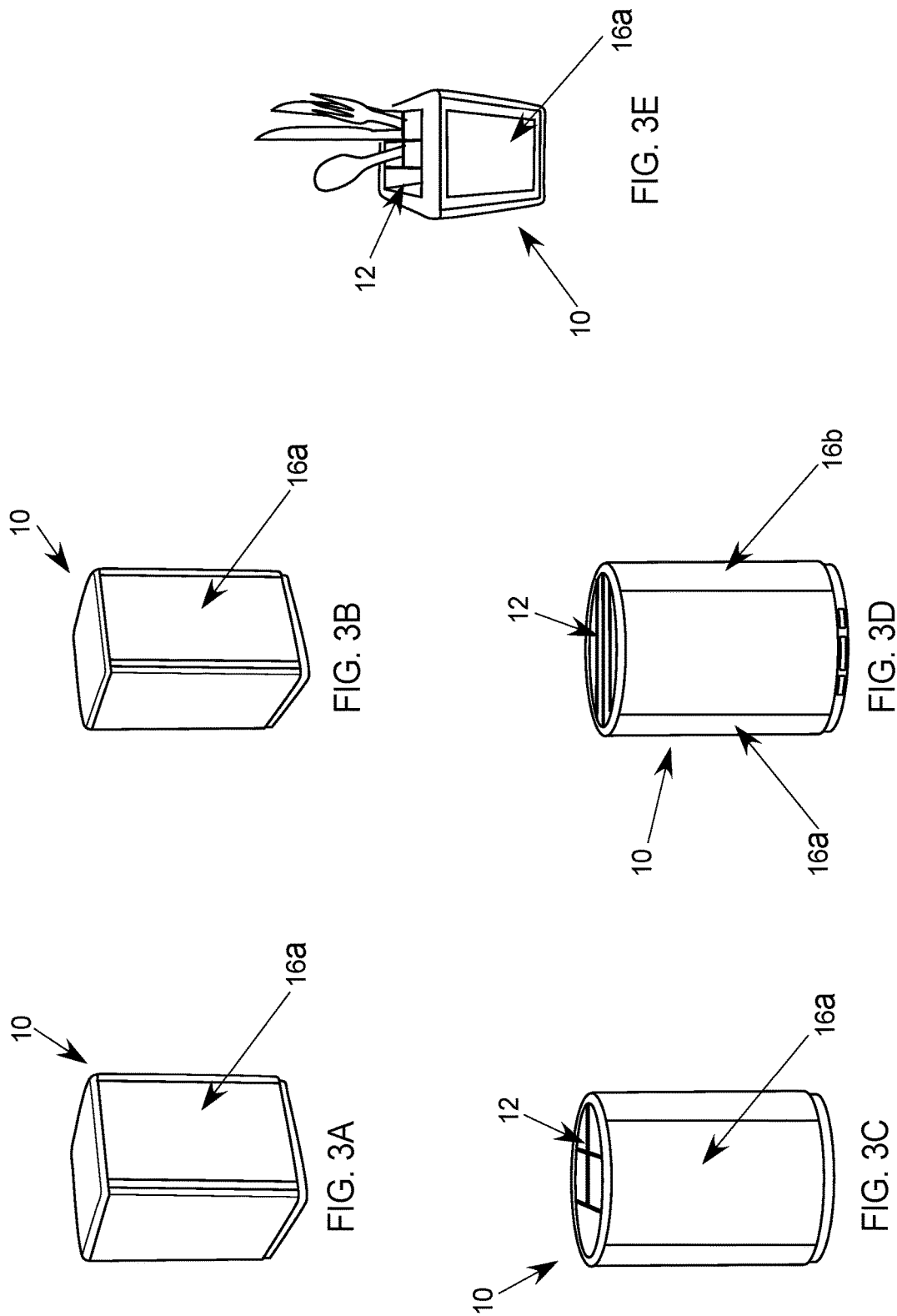
FIGS. 3A-3E provide perspective views of example form-factors of a digital billboard in a variety of embodiments.

FIGS. 3A-3E show perspective views of a variety of form-factors for the digital billboard 10 in one or more embodiments. FIGS. 3A-3B show perspective views of the digital billboard 10 with a substantially rectangular shape. FIGS. 3C-3D show perspective views of the digital billboard 10 with a substantially cylindrical shape. The removable module 12 that can be used for various purposes according to the deployment of the digital billboard 10. For example, if the digital billboard 10 is deployed in a restaurant, the removable module 12 can provide dividers, etc., that facilitate holding condiments, utensils, or other items.

The digital billboard 10 can include a speaker at the bottom or at the top. The speaker can generate basic sound notifications or sound for video content being displayed on the display panels 16a-b.

The digital billboard 10 in one or more embodiments can obtain customer feedback, serve as a bill request device, a bill display device, a bill payment device, etc.

Figure 4:
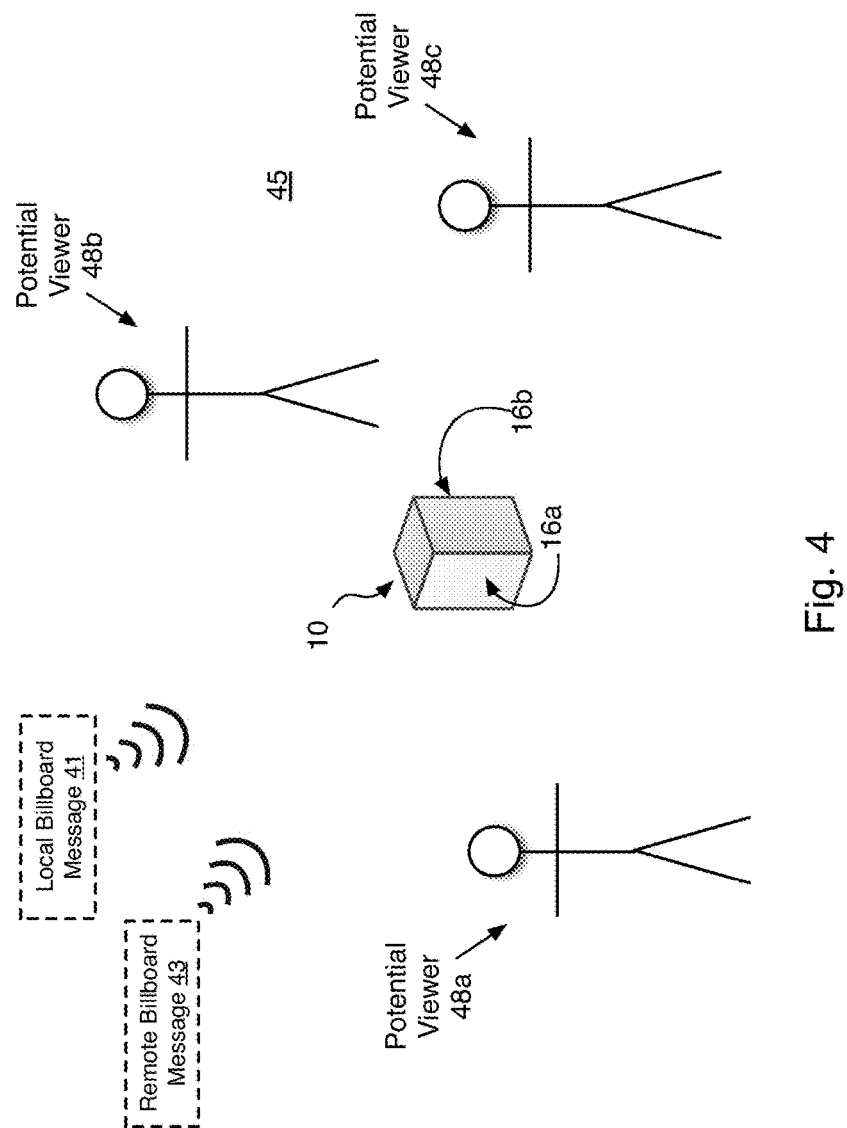
FIG. 4 shows a digital billboard placed in among a set of potential viewers of the digital billboard who are present in a gathering venue.

FIG. 4 shows the digital billboard 10 positioned in among a set of potential viewers 48a-c of the display panels 16a-b who are present in a gathering venue 45. The gathering venue 45 can be any venue in which people might gather for socializing, to attend business meetings, for enjoying food and beverages, to participate in discussion groups, etc. Examples of the gathering venue 45 include a restaurant, a cafe, a bar, a lounge, a club, a hotel, a spa, etc.

For example, the gathering venue 45 can be a cafe and the potential viewers 48a-c can be patrons of the cafe. The digital billboard 10 has a form factor, e.g., height and width of the display panels 16a-b and number and arrangement of the display panels 16a-b, that enables it to be placed on a table at which the potential viewers 48a-c can sit so that the display panels 16a-b are viewable all around the table. The form factor of the digital billboard 10 can be large enough so that the display panels 16a-b are readily readable but not so large as to be obnoxious so that the potential viewers 48a-c can choose to view messages or ignore them.

The form factor of the digital billboard 10 can be adapted to integrate with a function in the gathering venue 45. For example if the gathering venue 45 is a cafe, the digital billboard 10 can have a form so that it doubles as some other item that might otherwise be found on a cafe table, e.g., a condiment holder, a utensil holder, a lamp, a planter, etc.

The gathering venue 45 can have many digital billboards like the digital billboard 10 deployed throughout. For example, a cafe can have a digital billboard on each table.

The digital billboard 10 in one or more embodiments receives a local billboard message 41 adapted to an activity associated with the gathering venue 45 and a remote billboard message 43 adapted to an activity outside of the gathering venue 45. The digital billboard 10 renders the local and remote billboard messages 41 and 43 on the display panels 16a-b. For example, if the gathering venue 45 is a restaurant, the local billboard message 41 can provide information on specials of the day, new menu items, items in season, changes in operating hours, etc., and the remote billboard message 43 can be an advertisement for some other business or venue outside of the gathering venue 45 that might be of interest to the restaurant patrons.

The digital billboard 10 can render the local and remote billboard messages 41 and 43 on the display panels 16a-b so that the display panels 16a-b are mirror images of one another and provide the potential viewers 48a-c positioned around the digital billboard 10 with the same view. The digital billboard 10 can render the local and remote billboard messages 41 and 43 on the display panels 16a-b one at a time in an alternating fashion, or render them both at the same time, or in an extended display mode. There can be multiple local billboard messages and multiple remote billboard messages provided on the digital billboard 10. The digital billboard 10 can cycle through the local and remote billboard messages to increase the number of messages displayed.

The local and remote billboard messages 41 and 43 can include any combination of text, graphics, audio, video, etc.

In one or more embodiments, the digital billboard 10 obtains the local billboard message 41 from a local server in the gathering venue 45. For example, a local server can beam the billboard message 41 to the digital billboard 10 over a wireless communication channel, e.g., Wi-Fi or Bluetooth.

In one or more embodiments, the digital billboard 10 obtains the local billboard message 41 via a broadband network from a cloud-based server. For example, the digital billboard 10 can communicate via Wi-Fi to an Internet gateway or communicate with a cloud-based server via a broadband cell network, e.g., 3G/LTE.

In one or more embodiments, the digital billboard 10 obtains the remote billboard message 43 from a local server in the gathering venue 45. In other embodiments, the digital billboard 10 obtains the remote billboard message 43 via a broadband network from a cloud-based server.

In one or more embodiments, the remote billboard message 43 is selected in response to a set of parameters describing the gathering venue 45. The parameters describing the gathering venue 45 can include a venue type, e.g., a restaurant, a cafe, a bar, a lounge, a club, a hotel, a spa, etc. The parameters describing the gathering venue 45 can include its location, e.g., city, state, neighborhood, GPS or other coordinates, address, etc. The parameters describing the gathering venue 45 can include a marketing scale factor, e.g., upscale, midscale, discount, etc. The parameters describing the gathering venue 45 can include environmental data, e.g., data derived from measurements made by the digital billboard 10.

For example, the remote billboard message 43 selected in response to the parameters describing the gathering venue 45 can be an ad for an upscale jeweler if the gathering venue 45 is an upscale restaurant, or an ad for a discount retailer if the gathering venue 45 is a budget chain restaurant. In another example, the selected remote billboard message 43 can be an ad for a nearby bar if the gathering venue 45 is a restaurant.

In one or more embodiments, the digital billboard 10 includes an input mechanism that enables the potential viewers 48a-c to provide feedback pertaining to the gathering venue 45. One example of feedback is a request for the bill pertaining to the services rendered at the gathering venue 45. Another example of feedback is a comment or review pertaining to service, goods, menu items, performance of staff, etc.

Figure 5:
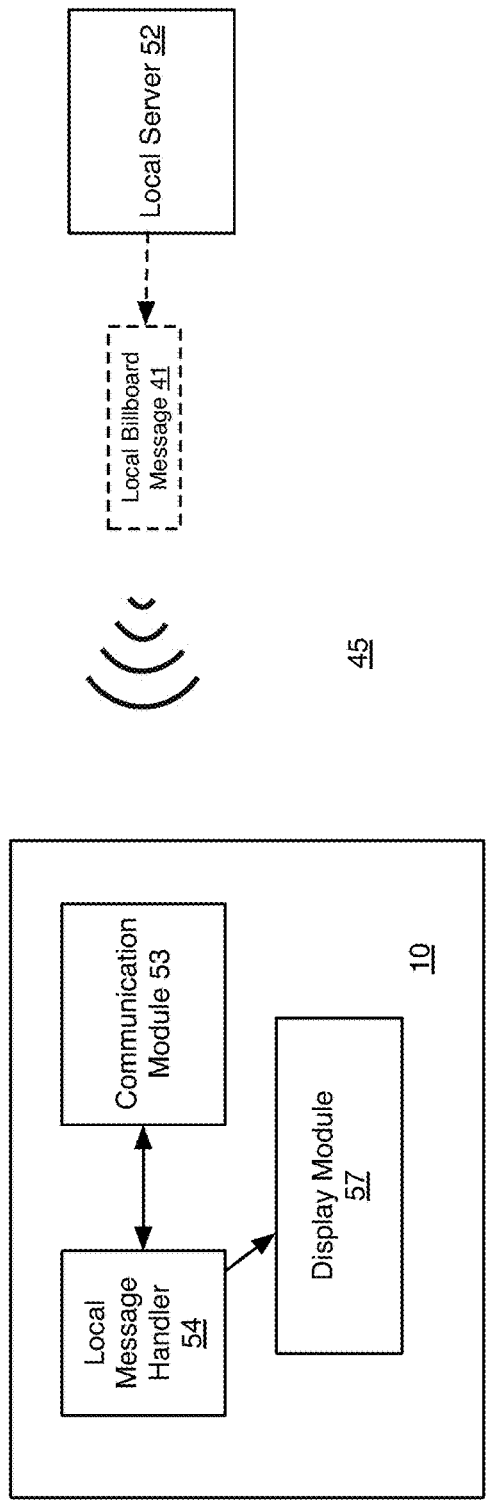
FIG. 5 shows a local message handler in a digital billboard in one or more embodiments.

FIG. 5 shows a local message handler 54 in the digital billboard 10 in one or more embodiments. The local message handler 54 obtains the local billboard message 41 from a local server 52 in the gathering venue 45 via a communication module 53 in the digital billboard 10. The communication module 53 can enable wireless communication with the local server 52 via, e.g., Wi-Fi, Bluetooth, etc. The local message handler 54 uses a display module 57 of the digital billboard 10 to display the local billboard message 41 on the display panels 16a-b.

Figure 6:
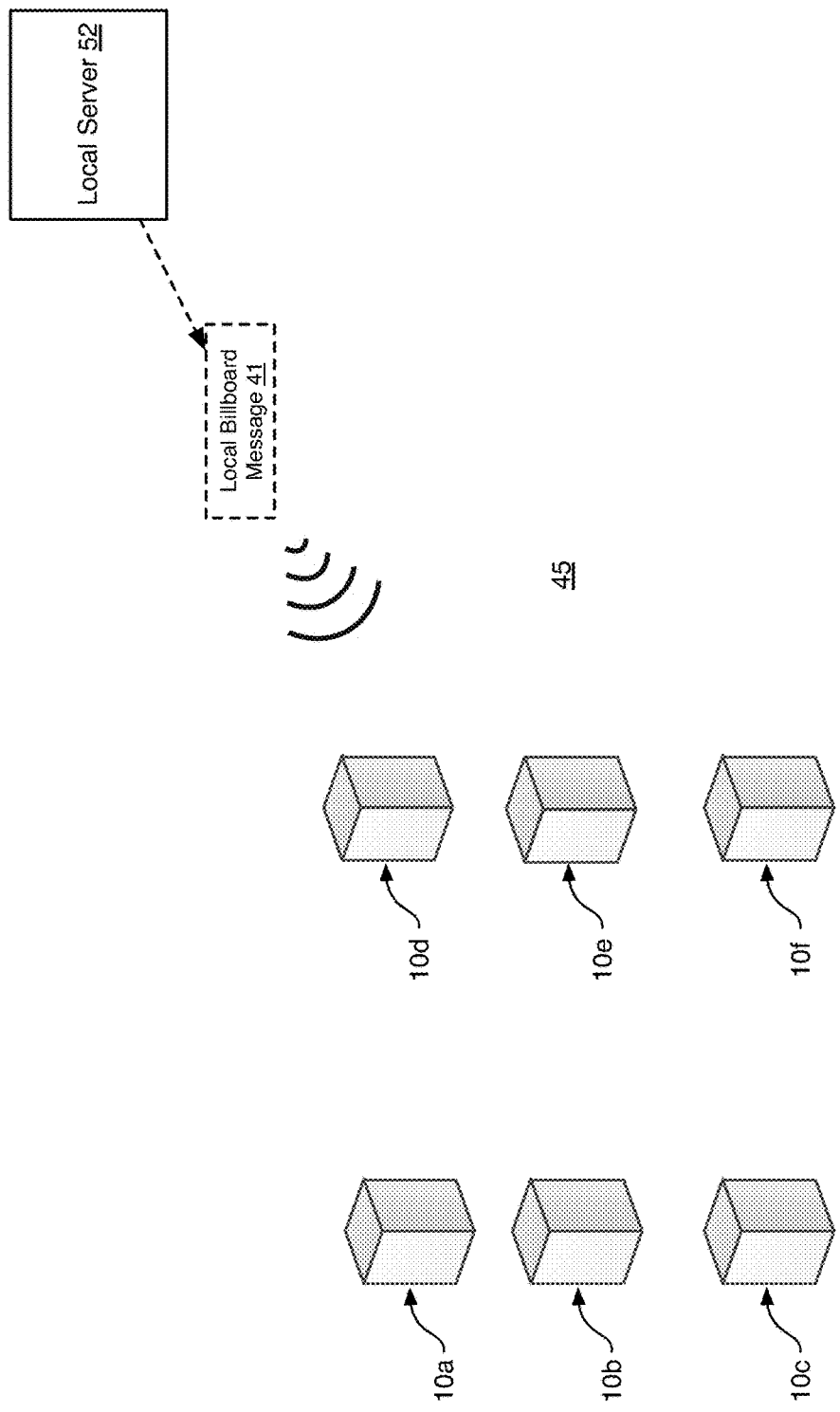
FIG. 6 shows a set of digital billboards placed about a gathering venue.

FIG. 6 shows a set of digital billboards 10a-f placed about the gathering venue 45. A local message handler in each of the digital billboards 10a-f obtains the local billboard message 41 from the local server 52 and displays it on its display panels. For example, the digital billboards 10a-f can be distributed among the tables in a cafe, restaurant, coffee shop, etc. There can be any number of the digital billboards 10a-f placed about the gathering venue 45.

Figure 7:
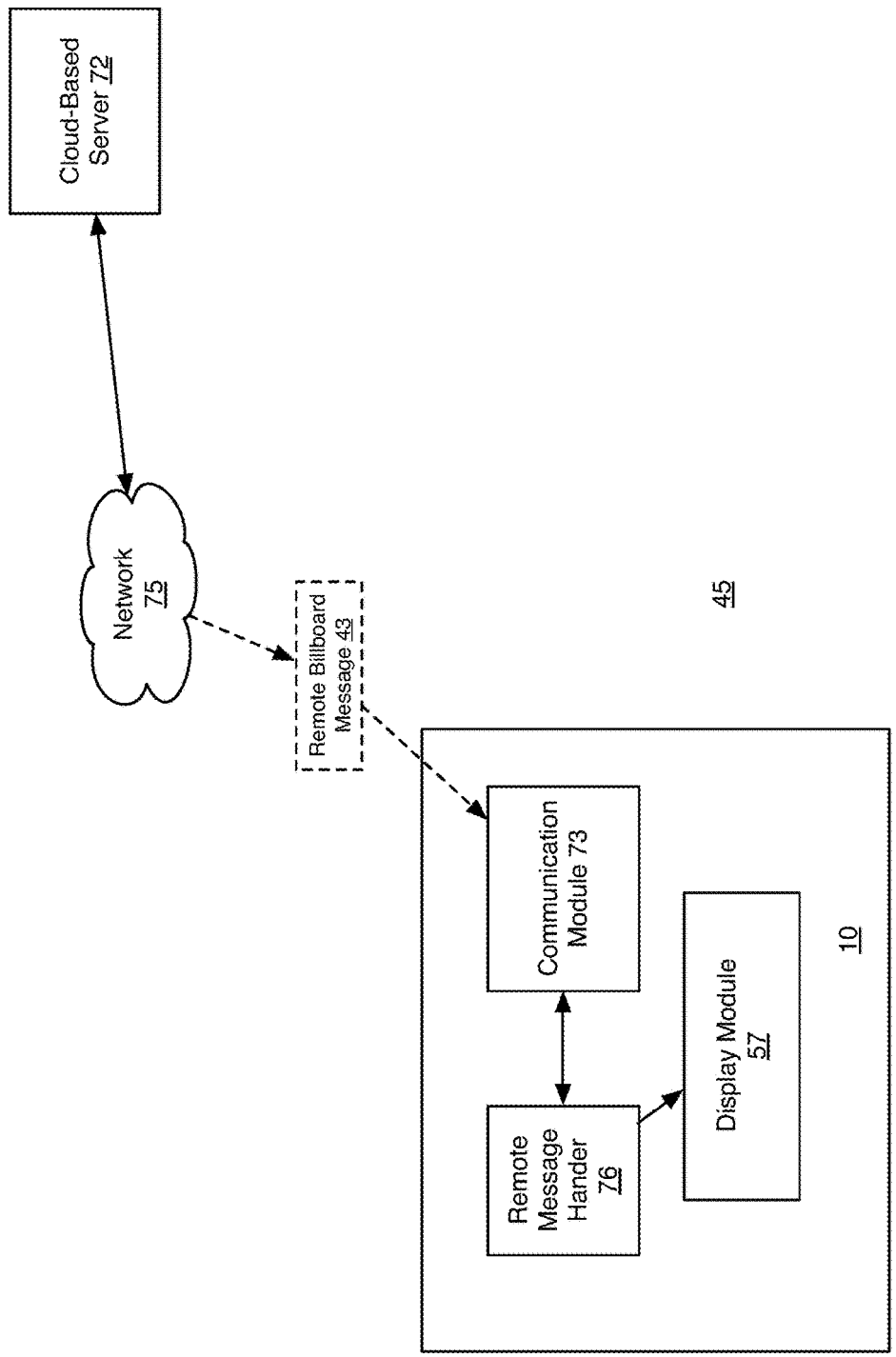
FIG. 7 shows a remote message handler in a digital billboard in one or more embodiments.

FIG. 7 shows a remote message handler 76 in the digital billboard 10 in one or more embodiments. The remote message handler 76 obtains the remote billboard message 43 from a cloud-based server 72 via a network 75 using a communication module 73 in the digital billboard 10. In this example embodiment, the communication module 73 enables communication via a broadband cell network, e.g., 3G/LTE. The remote message handler 76 uses the display module 57 to display the remote billboard message 43 on the display panels 16a-b.

Figure 8:
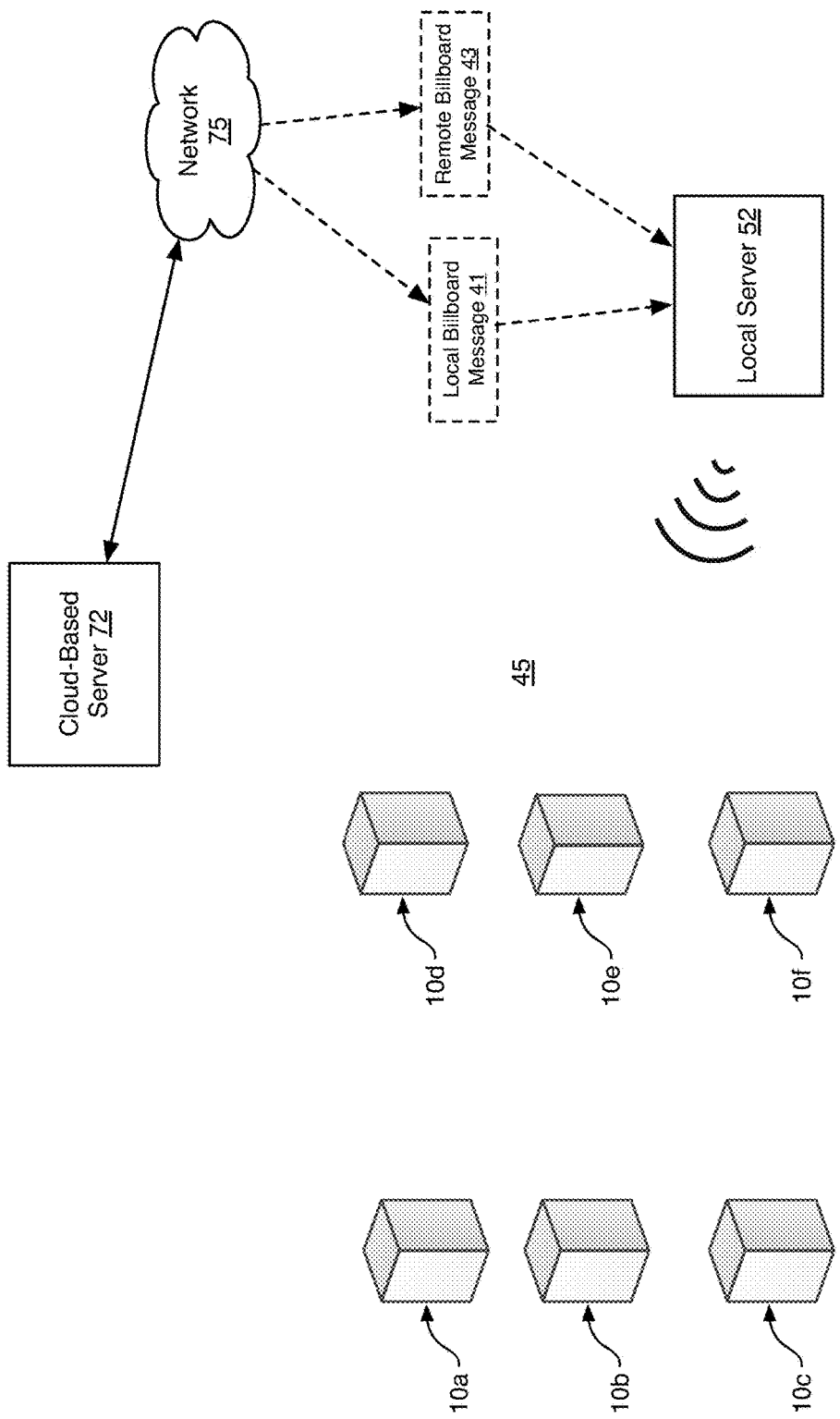
FIG. 8 shows an embodiment in which a set of digital billboards obtain a local billboard message and a remote billboard message from a cloud-based server via a local server in a gathering venue.

FIG. 8 shows an embodiment in which the digital billboards 10a-f obtain the local billboard message 41 and the remote billboard message 43 from the cloudbased server 72 via the local server 52 in the gathering venue 45. The local server 52 feeds the local and remote billboard messages 41 and 43 to the digital billboards 10a-f via, e.g., local Wi-Fi, Bluetooth, etc., in the gathering venue 45.

In one or more embodiments, the cloud-based server 72 includes a webbased user interface and software tools that enable, e.g., a proprietor or manager, etc., of the gathering venue 45, to create the local billboard message 41.

Figure 9:
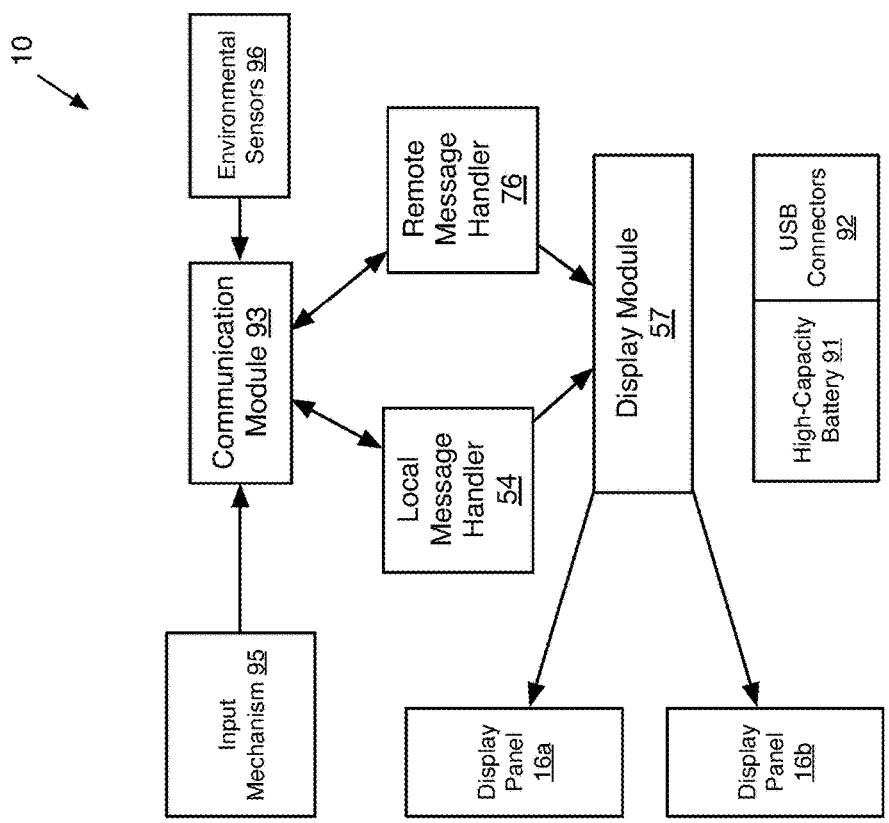
FIG. 9 illustrates a set of resource components of a digital billboard in one or more embodiments.

FIG. 9 illustrates resource components of the digital billboard 10 in one or more embodiments. The digital billboard 10 includes an input mechanism 95 that enables the potential viewers 48a-c to provide feedback pertaining to the activities provided in the gathering venue 45. The input mechanism 95 can be a touchscreen mechanism of the display panels 16a-b, an NFC or Bluetooth link to a mobile device, e.g., a smartphone, smart watch, etc., or other type of input mechanism. The feedback from the potential viewers 48a-c can be relayed by a communication module 93 in the digital billboard 10 to the local server 52. The local server 52 can upload the feedback to the cloud-based server 72. In some embodiments, the feedback from the potential viewers 48a-c can be uploaded by the communication module 93 to the cloud-based server 72.

The input mechanism 95 can include NFC (Near Field Communication) circuitry for communication and interaction with mobile devices, e.g., smart-phones, smart-watches or other wearable devices, of the potential viewers 48a-c. An NFC communication channel can enable in some embodiments bill payment by the potential viewers 48a-c.

The digital billboard 10 includes a set of environmental sensors 96 that obtain a set of environmental information pertaining to the gathering venue 45. Examples of environmental information include temperature, humidity, air quality, etc. The environmental data can be relayed by the communication module 93 to the local server 52 or the cloud-based server 72. The local server 52 can upload the environmental data to the cloud-based server 72.

The digital billboard 10 includes a high capacity battery 91 and a set of USB connectors 92. The USB connectors 92 enable the potential viewers 48a-c to connect and charge mobile devices off of the high capacity battery 91. The high capacity battery 91 can also power the digital billboard 10.

FIG. 10 illustrates the local server 52 in one or more embodiments. The local server 52 includes a local billboard manager 102 that maintains a set of information pertaining to each of the digital billboards 10a-f placed about the gathering venue 45 in a local billboard database 103. The local billboard database 103 can contain any information pertinent to the digital billboards 10a-f, e.g., network addresses, locations, environmental sensor readings, feedback obtained from potential viewers, local billboard messages, and remote billboard messages, etc.

The local billboard manager 102 feeds the local billboard message 41 to the digital billboards 10a-f via a local communication mechanism 101, e.g., Wi-Fi, Bluetooth, etc., in the local server 52. The local billboard manager 102 can generate a user interface that enables, e.g., a proprietor or manager, etc., of the gathering venue 45 to generate the local billboard message 41 using software tools, e.g., an ad banner or view creator, graphics, video, audio tools, etc., of the local billboard manager 102. The local billboard manager 102 can employ a user interface mechanism of the local server 52 or can generate a user interface on a mobile device that enables access to the software tools of the local billboard manager 102.

The local billboard manager 102 can obtain the local billboard message 41 from the cloud-based server 72 via a remote communication mechanism 104 and relay the local billboard message 41 to the digital billboards 10a-f via the local communication mechanism 101.

The local billboard manager 102 can obtain the remote billboard message 43 from the cloud-based server 72 via the remote communication mechanism 104 and relay the remote billboard message 43 to the digital billboards 10a-f via the local communication mechanism 101.

Figure 11:
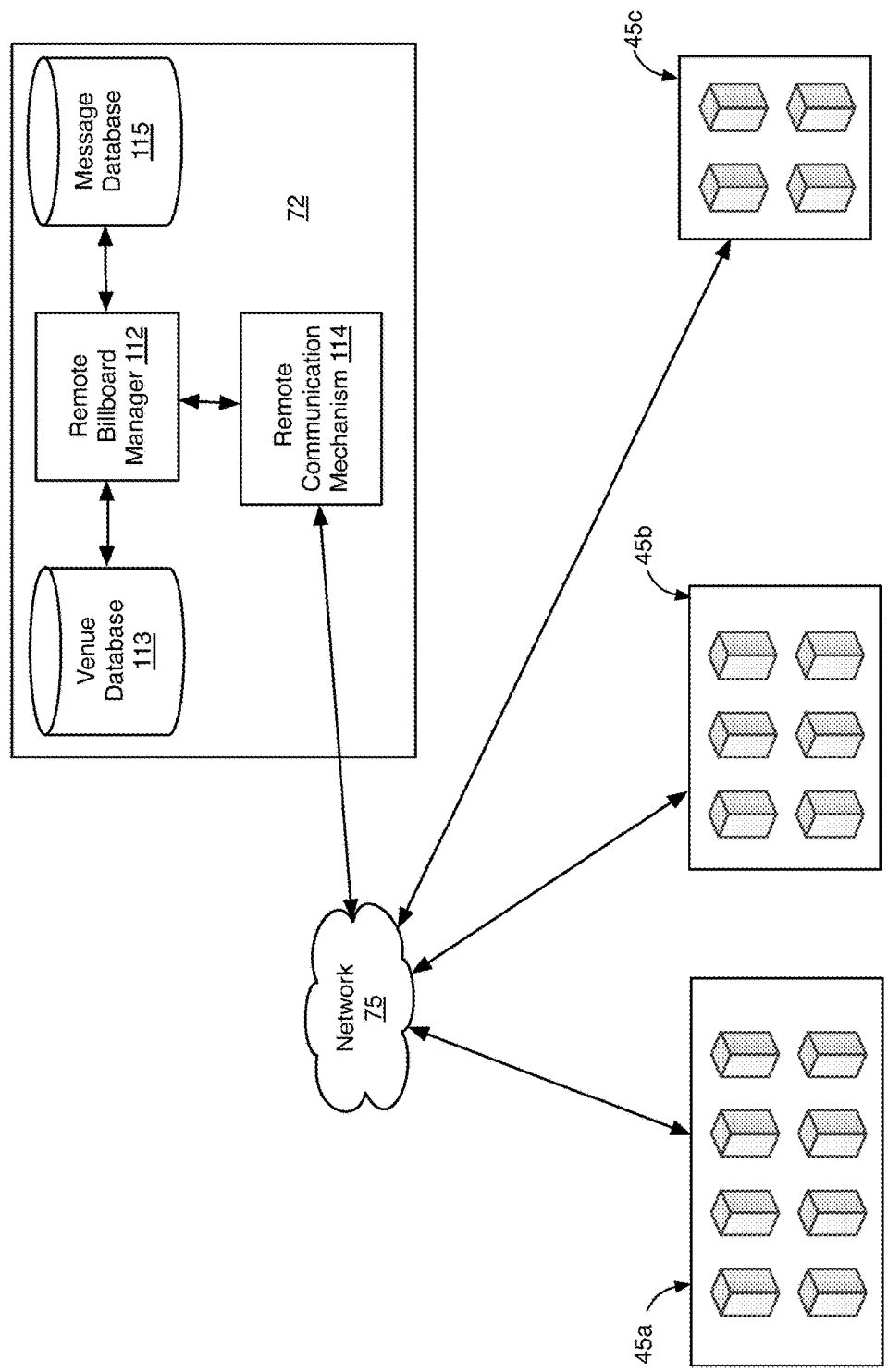
FIG. 11 illustrates a cloud-based server for a set of digital billboards in one or more embodiments.

FIG. 11 illustrates the cloud-based server 72 in one or more embodiments. The cloud-based server 72 includes a remote billboard manager 112 that maintains a set of information pertaining to each of the digital billboards distributed about a set of remote gathering venues 45a-c in a message database 115 and a venue database 113.

The message database 115 can hold local billboard messages for the respective remote gathering venues 45a-c. The message database 115 can hold remote billboard messages for the respective remote gathering venues 45a-c.

The venue database 113 can hold a venue type, e.g., a restaurant, a cafe, a bar, a lounge, a club, a hotel, a spa, etc., for each respective remote gathering venue 45a-c. The venue database 113 can hold a location, e.g., city, state, neighborhood, GPS or other coordinates, address, environmental data, etc., for each respective remote gathering venue 45a-c. The venue database 113 can hold marketing parameters, e.g., upscale, midscale, discount, etc., for each respective remote gathering venue 45a-c. The venue database 113 can hold feedback provided by the potential viewers in the respective remote gathering venues 45a-c.

The cloud-based server 72 includes a remote communication mechanism 114 that enables communication with the digital billboards distributed among the remote gathering venues 45a-45c. The remote communication mechanism 114 can enable direct communication with the digital billboards distributed among the remote gathering venues 45a-45c. The remote communication mechanism 114 can enable communication with the digital billboards distributed among the remote gathering venues 45a-45c via respective local servers in the remote gathering venues 45a-45c.

The remote billboard manager 112 can use the remote communication mechanism 114 to send local and remote billboard messages to the digital billboards distributed among the remote gathering venues 45a-45c. The remote billboard manager 112 can use the remote communication mechanism 114 to obtain feedback from potential viewers and sensor inputs from the digital billboards distributed among the remote gathering venues 45a-45c.

The remote gathering venues 45a-45c can include any combinations of types of gathering venues in any geographic distribution. Any one or more of the remote gathering venues 45a-45c can include a local server that enables communication with the corresponding digital billboards. Any one or more of the remote gathering venues 45a-45c can include digital billboards capable of communicating directly with the remote communication mechanism 114 via the network 75.

The remote billboard manager 112 can generate a web-based user interface that enables, e.g., proprietors or managers, etc., of the remote gathering venues 45a-45c to generate the respective local billboard messages using software tools, e.g., ad banner or view creator, graphics, video, audio tools, etc., of the remote billboard manager 112.

Figure 12:
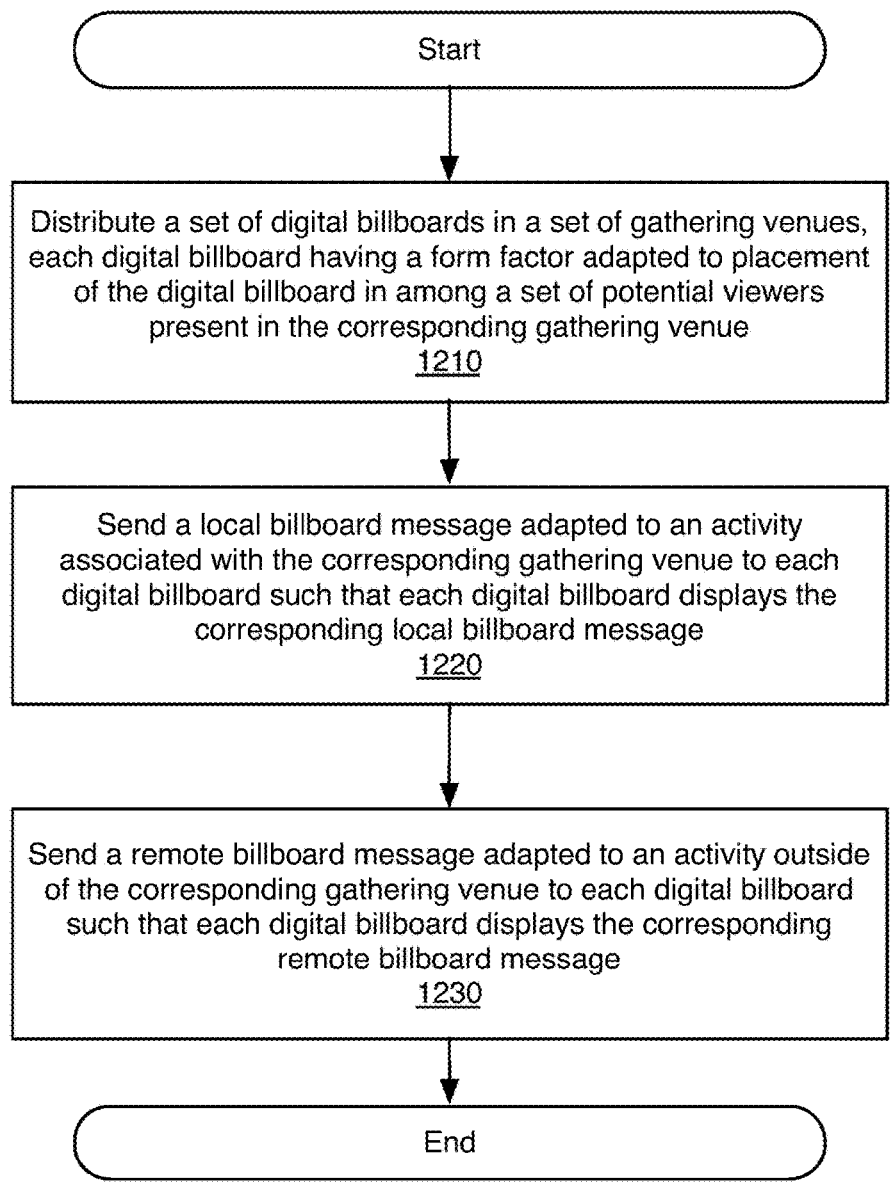
FIG. 12 illustrates a method for digital billboard messaging in one or more embodiments.

FIG. 12 illustrates a method for digital billboard messaging in one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 12 should not be construed as limiting the scope of the invention.

At step 1210, a set of digital billboards are distributed in a set of gathering venues. Each digital billboard has a form factor that enables placement of the digital billboard in among a set of potential viewers present in the corresponding gathering venue. The distribution and arrangement of the digital billboards in a gathering venue can be adapted to the local needs and functions of the gathering venue. The form factors of the digital billboards can be adapted to the local needs and functions of the gathering venue, e.g., using removable modules of the digital billboards.

At step 1220, a local billboard message adapted to an activity associated with the corresponding gathering venue is sent to each digital billboard such that each digital billboard displays the corresponding local billboard message. The local billboard messages can be locally generated in a gathering venue or remotely generated in a cloud-based server.

At step 1230, a remote billboard message adapted to an activity outside of the corresponding gathering venue is sent to each digital billboard such that each digital billboard displays the corresponding remote billboard message. The remote billboard messages can be selected based on a set of parameters associated with the corresponding gathering venues.

Figure 13:
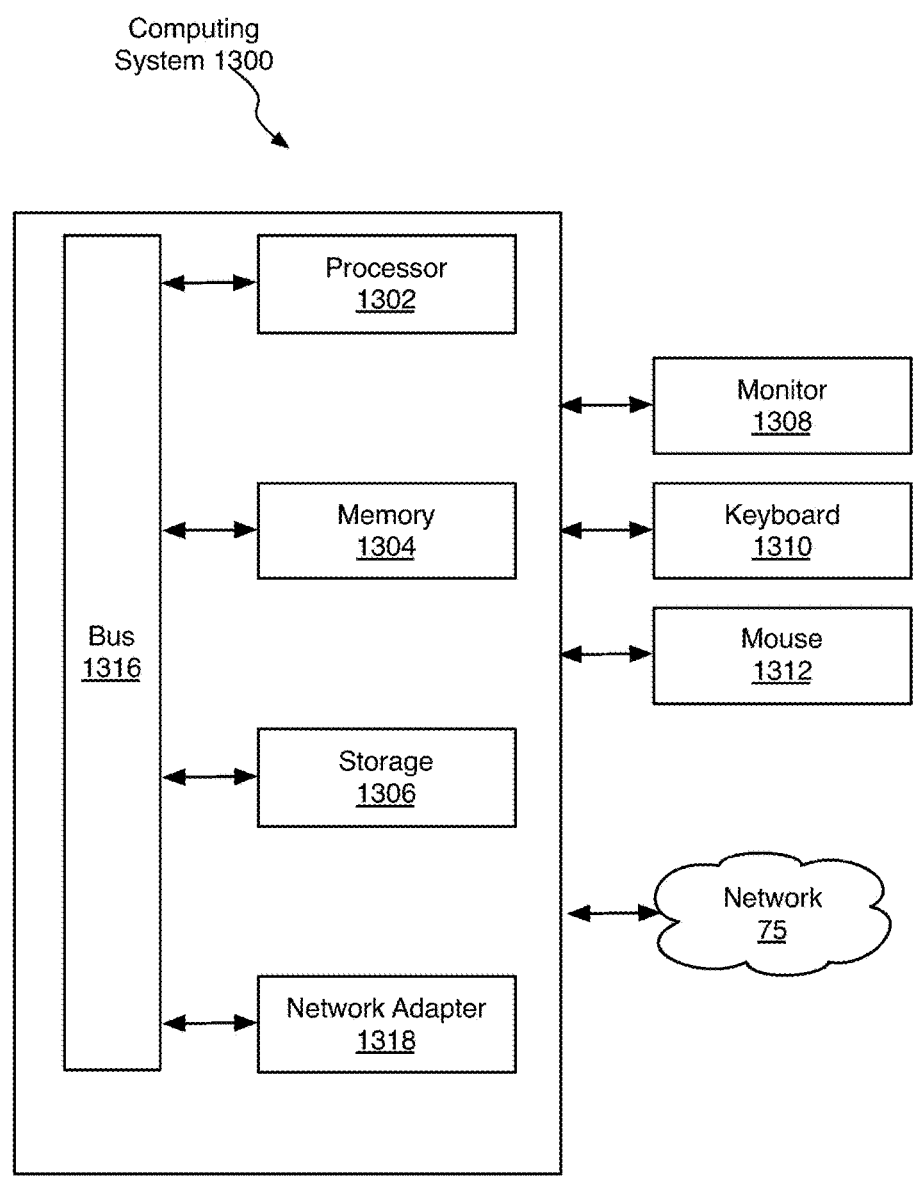
FIG. 13 illustrates a computing system upon which portions of a cloudbased server or a local server for digital billboards can be implemented.

FIG. 13 illustrates a computing system 1300 upon which portions of a cloud-based server or a local server for digital billboards can be implemented. The computing system 1300 includes one or more computer processor(s) 1302, associated memory 1304 (e.g., random access memory (RAM), cache memory, flash memory, etc.), one or more storage device(s) 1306 (e.g., a hard disk, an optical drive such as a compact disk (CD) drive or digital versatile disk (DVD) drive, a flash memory stick, etc.), a bus 1316, and numerous other elements and functionalities. The computer processor(s) 1302 may be an integrated circuit for processing instructions. For example, the computer processor(s) may be one or more cores or micro-cores of a processor. The computing system 1300 may also include one or more input device(s), e.g., a touchscreen, keyboard 1310, mouse 1342, microphone, touchpad, electronic pen, or any other type of input device. Further, the computing system 1300 may include one or more monitor device(s) 1308, such as a screen (e.g., a liquid crystal display (LCD), an light emitting diode (LED) device, an organic light emitting diode (OLED), a plasma display, touchscreen, cathode ray tube (CRT) monitor, projector, or other display device), external storage, input for an electric instrument, or any other output device. The computing system 1300 may be connected to the network 75 (e.g., a local area network (LAN), a wide area network (WAN) such as the Internet, mobile network, or any other type of network) via a network adapter 1348.

Figure 14:
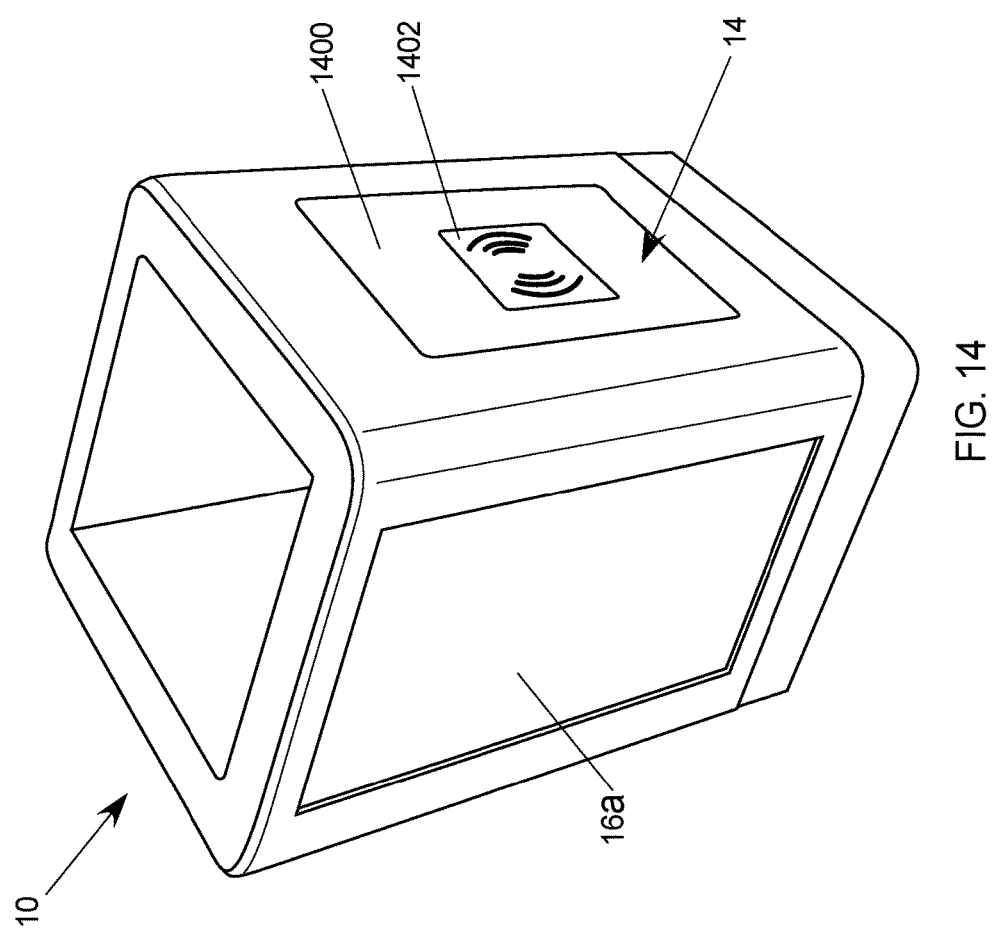
FIG. 14 illustrates an embodiment of the charging mechanism on a side of the digital billboard.
Figure 15:
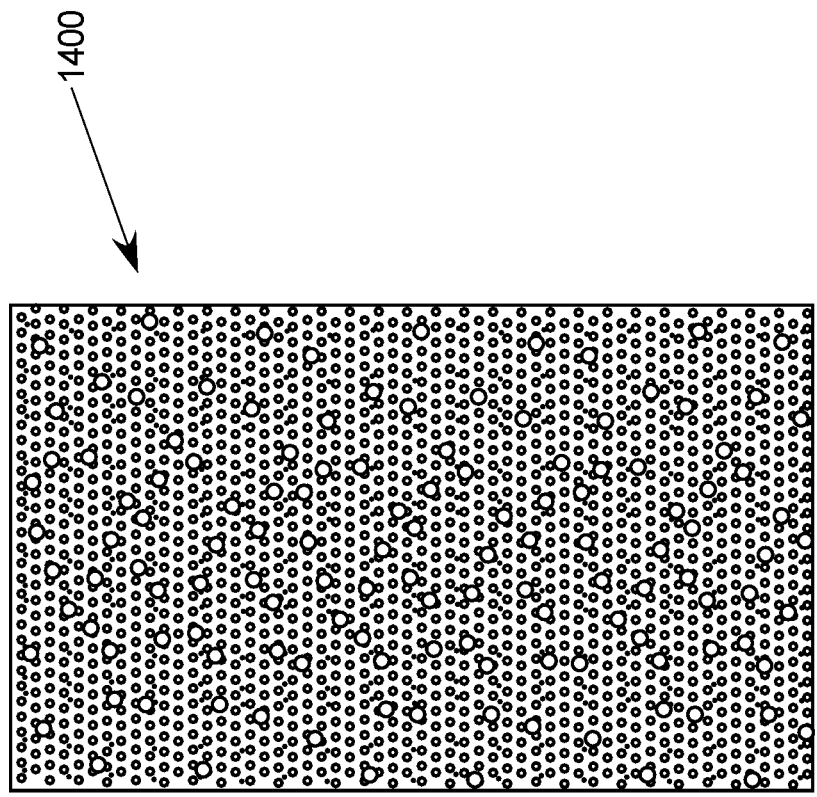
FIG. 15 is a close up view of the attachment mechanism for the embodiment of the charging mechanism in FIG. 14.
Figure 16:
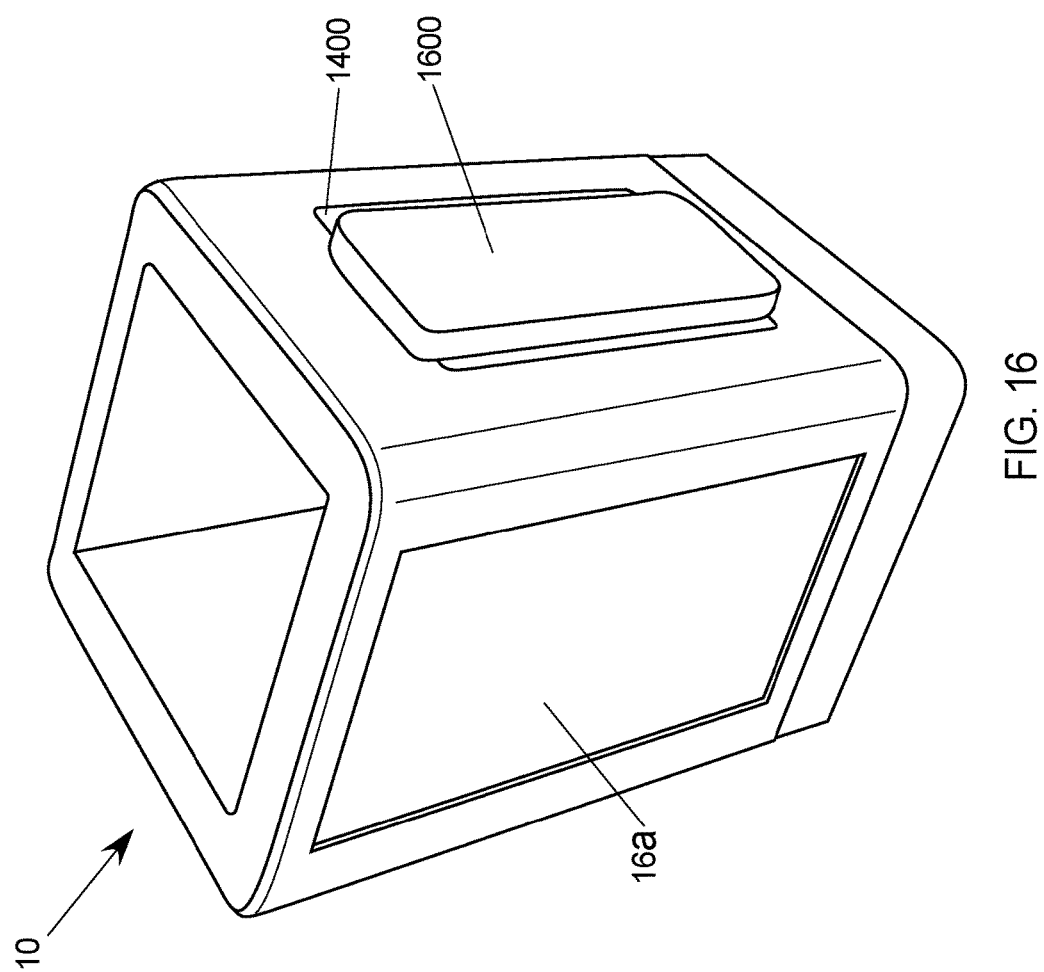
FIG. 16 illustrates a mobile device connected and charging using the embodiment of the charging mechanism in FIG. 14.

FIG. 14 illustrates an embodiment of the charging mechanism 14 on a side of the digital billboard 10. In this embodiment, the charging mechanism 14 may be on one or more sides of the digital billboard different from the display 16A. The charging mechanism 14 may include an attachment mechanism 1400 and a charging element 1402. The attachment mechanism 1400 may hold a mobile device against the side of the digital billboard and the charging element 1402 may wirelessly charge the battery of the mobile device in a known manner. The charging element 1402 is commercially available and well known and is not described further herein. The attachment mechanism 1400 may be an attachment tape that is a nano/micro suction cup material that is commercially available. For example, http://www.umbrands.co.uk is a site that sells such nano suction cup material and further details of the material is available herein and incorporated herein by reference. In one implementation, an AirStick brand tape (https://mosorganizer-.com/airstick that is incorporated herein and discloses further details of this tape) may be used. As shown in FIG. 15, the attachment tape 1400 may be a plurality of micro/nano suction elements so that, when a vacuum is present between a smooth non-porous surface, such as a surface of a mobile device, and a suction cup, the higher atmospheric pressure outside of the cup enables the suction cup to maintain its grip. Thus, the mobile device 1600 is pressed against and coupled to the attachment mechanism 1400 without any glue and remains coupled to the digital billboard as shown in FIG. 16 against the attachment mechanism 1400 until the user removes the mobile device from the charging mechanism.

While the foregoing disclosure sets forth various embodiments using specific diagrams, flowcharts, and examples, each diagram component, flowchart step, operation, and/or component described and/or illustrated herein may be implemented, individually and/or collectively, using a range of processes and components.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments may be devised which do not depart from the scope of the invention as disclosed herein.

The invention claimed is:

1. A digital billboard, comprising: a housing having a shape with one or more wall portions and a hollow central region; a set of display panels with each display panel being positioned on a wall portion of the housing and configured to provide an information display; a resource bay in the hollow central region that includes a set of resources including a processor that drive content displayed on the set of display panels and that communicate to and from the digital billboard; and a removable utensil holder module that fits into the hollow central region that provides a function that is adapted to a particular deployment of the digital billboard.

2. The digital billboard of claim 1, wherein the set of display panels further comprise a pair of touchscreen panels positioned on substantially opposite sides of the digital billboard.

3. The digital billboard of claim 1, wherein the set of resources include a communication mechanism that enables communication via a network.

4. The digital billboard of claim 1, wherein the set of resources include a communication mechanism that enables communication over a substantially short range with a mobile device.

5. The digital billboard of claim 1, wherein the set of resources include a set of batteries that power the digital billboard and that enable the digital billboard to charge a mobile device.

6. The digital billboard of claim 5 further comprising a charging mechanism attached to one or more of the wall portions of the housing.

7. The digital billboard of claim 6, wherein the charging mechanism further comprises one of a charging mechanism to charge the batteries and a charging mechanism to charge a mobile device.

8. The digital billboard of claim 1, further comprising a set of sensors for sampling a set of environmental data.

9. The digital billboard of claim 8, wherein the display panels display a message selected in response to the environmental data.

10. The digital billboard of claim 1, further comprising a set of LED lamps positioned on the digital billboard to provide ambient decorative effects adapted to the deployment.

11. The digital billboard of claim 1, wherein the removable module provides one of a passive function and an active function.

12. The digital billboard of claim 1, wherein the resources include a communication module that obtains, from a local server, a billboard message for display on the set of display panels.

13. The digital billboard of claim 1, wherein the resources include a communication module that obtains, from via a broadband network from a cloud-based server, a billboard message for display on the set of display panels.

14. The digital billboard of claim 1, wherein the resources include a mechanism that enables users to provide feedback.

15. The digital billboard of claim 6, wherein the charging mechanism further comprises a suction tape that holds a mobile device against a vertical wall of the housing adjacent a charging element.

\* \* \* \* \*